(12) United States Patent
Lehnert et al.

(10) Patent No.: US 7,494,558 B2
(45) Date of Patent: Feb. 24, 2009

(54) LAMINATE WITH IMPROVED PROPERTIES

(75) Inventors: Jörg Lehnert, Schwabmünchen (DE); Werner Groh, Schwabmünchen (DE); Michael Schöps, Berlin (DE); Hermann Weizenegger, Schwabmunchen (DE)

(73) Assignee: Johns Manville, Denver, CO (US)

( * ) Notice: Subject to any disclaimer, the term of this patent is extended or adjusted under 35 U.S.C. 154(b) by 786 days.

(21) Appl. No.: 10/271,595

(22) Filed: Oct. 17, 2002

(65) Prior Publication Data

US 2003/0092337 A1    May 15, 2003

(30) Foreign Application Priority Data

Oct. 18, 2001   (DE)   ................. 101 51 411

(51) Int. Cl.
*B29C 65/00* (2006.01)
*D04H 3/00* (2006.01)

(52) U.S. Cl. ................. 156/148; 156/167; 156/180; 156/181; 442/60; 442/381; 442/383; 442/389; 428/337

(58) Field of Classification Search ................. 156/148, 156/242, 243, 181, 167, 180; 442/60, 381, 442/383, 389; 428/337
See application file for complete search history.

(56) References Cited

U.S. PATENT DOCUMENTS

| | | | | | |
|---|---|---|---|---|---|
| 4,175,154 | A | * | 11/1979 | Faust et al. | ............. 428/312.6 |
| 5,017,426 | A | * | 5/1991 | Greiser et al. | ................. 442/85 |
| 5,282,915 | A | * | 2/1994 | Westlake, Jr. | ............... 156/243 |
| 5,342,680 | A | * | 8/1994 | Randall | ........................ 442/71 |
| 5,698,302 | A | * | 12/1997 | Brandon et al. | ............. 428/215 |
| 5,704,179 | A | * | 1/1998 | Lehnert et al. | ................ 52/408 |
| 6,514,889 | B1 | * | 2/2003 | Theoret et al. | .............. 442/320 |
| 6,630,046 | B1 | * | 10/2003 | Plotz | .......................... 156/148 |

FOREIGN PATENT DOCUMENTS

| | | | |
|---|---|---|---|
| DE | 1 947 126 | | 10/1966 |
| DE | 43 39 709 | A | 5/1995 |
| DE | 199 35 531 | | 2/2001 |
| DE | 199 55 730 | | 6/2001 |
| EP | 0 667 427 | A | 8/1995 |
| JP | 05044333 | A * | 2/1993 |
| WO | WO 01 08879 | A | 2/2001 |
| WO | WO 01 08882 | A | 2/2001 |
| WO | WO 01 09420 | A | 2/2001 |
| WO | WO 01 09421 | A | 2/2001 |
| WO | WO 01 09428 | A | 2/2001 |
| WO | WO 0109428 | A2 * | 2/2001 ................. 156/148 |

OTHER PUBLICATIONS

Merriam-Webster Online Dictionary. URL: http://www.m-w.com/cgi-bin/dictionary?book=Dictionary&va=calender.*
Translation of JP 05-0044333 A.*
Complete Textile Glossary. Celanese Acetate LLC, 2001. pp. 32-33. Available Online at http://www.celaneseacetate.com/textile_glossary_filament_acetate.pdf.*
Lunenschlob, Joachim, et al., VLIESSTOFFE, Georg Thieme Verlag Stuttgart, New York, pp. 188-192, 1982.

* cited by examiner

*Primary Examiner*—Justin Fischer
(74) *Attorney, Agent, or Firm*—Robert D. Touslee

(57) ABSTRACT

Composites made from at least two plies are described, where one of the outer layers is a layer comprising glass fibers, and in particular is a staple glass fiber nonwoven. The layers have been bonded to one another by needling, and the extent of this needling is such that some of the fibers of the organic nonwoven emerge from the surface of the glass fiber sheet. The composite is then provided with a binder by using a rotating roll for single-side application to the glass fiber surface. The composites are particularly suitable for producing bituminized prefabricated roofing and waterproofing sheets, and as backings for coatings, e.g. PVC coatings.

17 Claims, No Drawings

LAMINATE WITH IMPROVED PROPERTIES

The invention relates to a laminate which is composed of at least two layers, namely of a layer comprising glass fibers, in particular of a staple glass fiber nonwoven, and of a nonwoven made from synthetic organic fibers, these being bonded to one another by needling. In particular, the laminate has improved delamination resistance and stability of the layer comprising glass fibers and of the composite, and is particularly suitable as an inner backing for bituminized prefabricated roofing.

PRIOR ART

Disclosures and descriptions of laminates which are composed of two nonwovens or else, where appropriate, of more than two nonwovens began to appear quite some time ago.

For example, EP 0 176 847 A2 describes a laminate built up from a synthetic fiber nonwoven made from synthetic fibers, in particular continuous polyester filaments, and from a nonwoven layer made from mineral fibers. The synthetic fiber nonwoven and also the mineral fiber nonwoven are precompacted and then bonded to one another by needling. Neither the description nor the drawing in that European Patent Application indicates that any of the synthetic fibers are intended to protrude from the outer surface of the glass fiber nonwoven.

In order to improve the dimensional stability of the laminates described in that European Patent Application, EP 0 242 524 B1 proposes the further addition of longitudinal reinforcing yarns made from a mineral material to the mineral fiber nonwoven.

EP 0 379 100 B1 relates to a laminate made from a filament nonwoven and from a glass fiber nonwoven, the production of which likewise involves needling precompacted glass fiber nonwovens and a synthetic fiber nonwoven to one another and then subjecting these to final compaction using a specific flame-retardant binder, whereupon the saturated laminate is subjected to a squeeze-removal procedure to reduce binder content.

Similar two-ply laminates are also described in ZA-94 027 63 A.

The PCT Application WO 01/08882 discloses a laminate which has two or more plies and is produced from a nonwoven made from continuous polyester filaments and a staple glass fiber nonwoven, by firstly precompacting a nonwoven made from continuous polyester filaments (Spunbond), and applying this precompacted polyester filament nonwoven to a staple glass fiber nonwoven precompacted using a resin, in particular using a urea resin or melamine resin, and using needling from the polyester side in the direction of the glass fiber nonwoven to bond these two nonwovens. During this process, some of the filaments of the polyester filament nonwoven penetrate through the staple glass fiber nonwoven, and some of the filaments emerge and lie on the surface of the staple glass fiber nonwoven. The entire nonwoven material is finally compacted by saturation in a binder bath and a squeeze-removal procedure, and then drying, the emerging fibers thus having been secured by adhesive bonding to the outer surface of the glass fiber nonwoven.

The German Patent Application 19955730.6 describes a process for producing backings from bonded nonwovens, using hydrodynamic needling at a water-jet pressure in the range from 100 to 400 bar. Here again, some of the organic fibers can emerge from the lower side of the composite and lie on the surface.

The above-mentioned composites have many good properties. However, these laminates which use a binder for final consolidation has shortcomings in fire performance and elongation performance.

In addition, there are increased process costs and increased material costs, and also the problems of further processing, e.g. during subsequent bituminization to produce prefabricated roofing, since the binder present in the laminate has an adverse effect on impregnation performance.

The PCT Application WO01/09420 describes a laminate which is composed, inter alia, of a nonwoven made from organic synthetic fibers and a staple glass fiber nonwoven precompacted using a resin. Some of the fibers of the upper nonwoven penetrate through the underlying glass fiber nonwoven during this process. The needled laminate has been heat-shrunk and comprises no final-consolidation binder.

Although the above-mentioned binder-free composites have many good properties, there remains a requirement for composites with improved properties. This applies in particular to the delamination resistance and breaking strength of the laminates.

The German Application (File: 101 11 868) attempts to overcome the disadvantages of the binder-free laminate by singeing the nonwoven surface. This process considerably increases delamination resistance, since the polymer filaments shrunk by the action of heat interlock on the glass nonwoven surface and thus make delamination more difficult. However, the process is technically complicated and does not give any improvement in breaking strength.

There is therefore a requirement for composites which exhibit a further improvement in delamination resistance, have improved breaking strength, can be produced simply and inexpensively, can be processed particularly effectively to give prefabricated roofing and waterproofing sheets, and in particular absorb bitumen readily and give bituminized prefabricated roofing and bituminized waterproofing sheets which are easy to use during roof construction.

It is therefore an object of the invention to provide a laminate made from at least two layers and having improved delamination resistance and stiffness, and increased breaking strength. This laminate is to be capable, for example, of saturated with bitumen or with other polymers to give in particular a suitable backing for prefabricated roofing or a suitable backing for waterproofing sheets, in particular for bituminized prefabricated roofing or for bituminized waterproofing sheets, where these have excellent properties. The laminate is also to be capable of receiving coatings, for example those which use PVC.

BRIEF DESCRIPTION OF THE INVENTION

The object is achieved by means of a process for producing a laminate which encompasses at least two layers, namely a nonwoven made from synthetic organic fibers and, serving as outer layer, a layer comprising glass fibers, by applying a nonwoven made from synthetic organic fibers to a layer comprising glass fiber and precompacted using a resin, in particular using a urea resin or melamine resin, bonding the two layers by needling in the direction of the layer comprising glass fibers, and carrying out the needling in such a way that some of the synthetic fibers penetrate the layer comprising glass fiber and some of the synthetic fibers emerge from the outer surface of the layer comprising glass fiber, and using a rotating roll to provide one side of the laminate with a binder, onto the layer comprising glass fiber, and then subjecting the laminate to drying.

The layer used comprising glass fibers is preferably a staple glass fiber nonwoven. The layer comprising glass fibers may also be a glass fiber woven or a glass fiber scrim.

To produce the laminate it is preferable to use a nonwoven made from continuous polyester filaments. It is also advantageous to use a staple glass fiber nonwoven which has been precompacted using from 5 to 45%, based on the weight of the glass fiber nonwoven, of a urea resin or melamine resin. Mechanical needling with a perforation density of from 15 to 50 perforations per $cm^2$ is preferred.

Another advantageous embodiment of the process of the invention uses hydrodynamic needling. This needling preferably uses a water-jet pressure in the range from 100 to 400 bar, with preference from 100 to 600 bar.

The invention further provides a laminate which can be produced by one of the processes described above.

The invention also provides the use of the laminates of the invention for producing prefabricated roofing or producing waterproofing sheets, in particular for producing bituminized prefabricated roofing or for producing bituminized waterproofing sheets, or else as a backing for coatings, in particular for coatings which use PVC, or for producing PVC-coated prefabricated roofing.

DETAILED DESCRIPTION OF THE INVENTION

The process of the invention begins by producing a laminate which is composed of two or, where appropriate, more plies, and comprises at least one ply made from a layer comprising glass fibers and at least one ply made from organic fibers or polymer fibers or polymer filaments, preferably polyester filaments.

For the production of laminates which comprise staple glass fiber nonwovens and which are preferably used for the purposes of the invention, reference is made to the PCT Applications WO 01/09420A2 and WO 01/08882, the disclosure content of these specifications being expressly incorporated herein by way of reference.

Instead of a glass fiber nonwoven, use may also be made of glass wovens or scrims which have been preconsolidated using a binder, such as polyvinyl acetate and starch, or with a urea resin or melamine resin. In this context, reference is made to the PCT Application WO 01/08879A2, of which the disclosure content in relation to the structure and production of the laminate is expressly incorporated herein by way of reference.

Another advantageous embodiment of the process of the invention involves hydrodynamic needling. In this context, reference is made to the PCT Application WO 01/09421A2, the disclosure content of which is expressly incorporated herein by way of reference. This needling preferably takes place using a water-jet pressure in the range from 100 to 400 bar.

In the process of the invention it is important that the layer comprising the glass fibers, preferably the staple glass fiber nonwoven, forms at least one of the outer layers. A nonwoven made from synthetic fibers is applied to this sheet, preferably a staple glass fiber nonwoven, preferably precompacted using a urea resin or melamine resin. This synthetic-fiber nonwoven may be composed of staple fibers, but use is preferably made of a nonwoven made from polyester filaments (spunbond). The polyester filament nonwoven has preferably been mechanically and/or thermally precompacted, and is then bonded to the glass fiber sheet by needling in the direction of the glass fiber sheet. The intensity with which this needling is carried out is such that some of the synthetic fibers enter the layer comprising glass fibers, in particular the glass fiber nonwoven, and some of these fibers emerge from the outer surface of the glass fiber sheet. The glass fiber side of the laminate is then passed over a rotating roll wetted with a binder, with the result that the binder penetrates into the glass fiber sheet, and secures, within the layer comprising glass fiber and on its surface, the polymer filaments which by virtue of the needling process protrude through the layer comprising glass fiber. The laminate is then dried in an oven.

In principle, any spinnable polymer is suitable for producing the spunbond nonwoven. It is preferable to use polyester filament nonwovens, in particular polyethylene terephthalate filament nonwovens or polypropylene filament nonwovens. The polymer filament nonwovens are mechanically/hydrodynamically and/or thermally precompacted. Preference is given to mechanical and thermal treatment which simultaneously reduces shrinkage.

The staple glass fiber nonwoven has preferably been precompacted using from 5 to 45%, in particular using from 5 to 30%, based on the weight of the glass fiber nonwoven, of a urea resin or melamine resin. The weight of the glass nonwoven is 30-120 $g/m^2$, preferably from 50 to 90 $g/m^2$.

Preference is given to mechanical needling with a total perforation density of from 15 to 50 perforations per $cm^2$. Another advantageous embodiment of the process of the invention uses hydrodynamic needling. This needling advantageously uses a water-jet pressure in the range from 100 to 600 bar, with preference from 100 to 400 bar.

In another step, the resultant laminates which comprise no final-consolidation binder are then passed over a rotating roll. The roll surface is wetted with a binder by partial immersion into a binder bath. The wetted roll surface conveys the binder onto just one side of the laminate, the glass fiber side of the laminate being passed over the roll, so that only this side of the laminate is wetted.

Due to the single-side contact of the layer comprising glass fibers, in particular of the glass nonwoven, with the wetted roll surface leads to absorption of the binder by virtue of capillary forces into the layer comprising the glass fibers, in particular into the glass fiber nonwoven. The manner of application of the binder must be such that sufficient amounts of the binder penetrate into the layer comprising glass fibers, but such that there is no, or only insignificant, provision of the binder to the polyester nonwoven. The polyester filaments which, by virtue of the needling, have been needled into and through the layer comprising glass fibers or through the glass fiber nonwoven, some of the filaments protruding therefrom, are secured by the binder in and on the surface of the layer comprising glass fibers or of the glass fiber nonwoven. The polyester nonwoven located on the layer comprising glass fibers or on the glass nonwoven is binder-free and can therefore contribute to the advantageous properties of the laminate of the invention.

Binders which may be used are straight acrylates, copolymers of styrene, butadiene, and acrylates, and blends with thermoset binders, such as urea resins or melamine resins. The binder bath into which the rotating roll dips in order to wet the surface is an aqueous dispersion or solution of these binder constituents. The solutions used here are of 5-50% strength, and 10-20% strength binder mixtures have proven particularly suitable. 10-40 $g/m^2$ of binder are typically applied to the glass fiber nonwoven, preferably 10-25 $g/m^2$. The laminate is not subjected to any subsequent squeeze-removal procedure.

The laminate is then dried in an oven or other apparatus.

The single-side application of binder dramatically increases resistance to delamination, and in some instances it is impossible to separate the composite without irreversible damage. This extent of improvement to delamination resistance was completely unexpected, and also has the effect of reducing the number of perforations during needling (needling density).

Surprisingly, it was possible to reduce the number of perforations by over 30%. A reduced needling density dramatically reduces damage to the glass fiber nonwoven, and this is associated with an improvement in the mechanical properties of the composite.

Besides improved delamination resistance, good elongation performance is also apparent, since there is almost no binder content in the polymer nonwoven to affect elongation. There is an improvement in fracture performance, since the binder in the glass nonwoven can remedy or compensate the consequences of damage due to the needling. The result is increased process reliability. In addition, the process of the invention gives the laminate advantageous stiffness and improved strength.

The single-side application method removes the need to use a pad-mangle roll. The considerable glass fiber damage always associated with this is therefore avoided. The low binder content in the layer comprising glass fibers or in the glass fiber nonwoven has no substantial effect on fire performance, while the small amounts of materials and the simple process permit a considerable reduction in production costs.

The composites produced by the process of the invention also have very high and uniform absorption capability for materials such as bitumen or similar compositions applied to the composite via saturation with the bituminizing composition or the like, or as a surface layer on the composite. Because there is substantially no binder in the polyester, absorption capability with respect to these materials is excellent, and distribution of the bitumen in the composite is uniform and complete.

Since the absorption of the bitumen proceeds very uniformly, the bituminized prefabricated roofing obtained has a clear, regular and even surface, i.e. with no corrugation. Even when the backing webs used have reinforcing threads for longitudinal reinforcement, the bituminized prefabricated roofing obtained has a particularly uniform surface which gives no indication of the internal structure of the backing nonwoven.

The laminates of the invention may also be coated, for example by applying one or more layers of a polymeric material, such as PVC or similar materials.

The adhesion of the coating to the backing composite is excellent. In this context reference is made to the German Patent Application DE 199 55 713, the disclosure content of which is expressly incorporated herein by way of reference.

Although the invention has been described here predominantly with reference to a two-ply laminate, it is entirely possible according to the invention to produce laminates which are composed of more than two layers, for example laminates which comprise, besides the glass fiber layer which forms one of the surfaces of the composite and the layer of a nonwoven made from synthetic organic fibers and applied thereto, other layers, e.g. another layer made from organic fibers, or else another glass fiber layer. There may also be one or more layers present which comprise reinforcing threads.

It is important that one outer layer through which the fibers are driven, and from which some of the fibers protrude, is a layer comprising glass fibers, in particular a staple glass fiber nonwoven.

The unexpected extent to which delamination resistance was increased was particularly surprising.

The process of the invention is suitable for treating laminates whose final compaction has not used a binder. By way of the invention it is possible to achieve high delamination resistance and high strength of the laminate without losing the advantages of a binder-free laminate, and without having to suffer the disadvantages of binder use.

The examples below give further description of the invention:

EXAMPLE 1

A nonwoven is produced from polyethylene terephthalate filaments by deposition on a substrate and is then precompacted thermally with the aid of a calendar. This nonwoven is fed onto a melamine-resin-precompacted staple glass fiber nonwoven (weight per unit area 60 g/m$^2$), the glass nonwoven being placed below the polyester nonwoven. The two nonwovens are then bonded to one another by needling at 39 perforations/cm$^2$, the cycle advance ratio being 12 mm/cycle. The nonwoven is then fully shrunk during passage through a calendar whose surface temperature is 240° C. The resultant laminate has a total weight per unit area of 168 g/m$^2$.

After heat-treatment, the laminate is passed over a roll whose peripheral speed is the same as the web speed of 17 m/min. The roll dips into a binder bath which is composed of a 15% strength aqueous solution of an acrylate binder. The laminate wetted on one side is then dried in an oven at 200° C. The binder content is 20 g/m$^2$.

EXAMPLE 2

A backing is produced as in Example 1, the nonwovens produced having a weight per unit area of 187 g/m$^2$.

EXAMPLE 3

A backing is produced as in Example 1, the nonwovens produced having a weight per unit area of 223 g/m$^2$.

EXAMPLE 4

A backing is produced as in Example 1, the nonwovens produced having a weight per unit area of 246 g/m$^2$.

Table 1 shows the results of measurements of delamination resistance, ultimate tensile strength (longitudinal/transverse), glass nonwoven strength (l/t), load at 4% (L4) and 15% (L15), made on the specimens of the examples and appropriate comparative specimens (*) produced without binder application but identically in other respects.

| Ex. | Weight per unit area [g/cm$^2$] | Delam. resistance [daN/5 cm] | UTS(L)/ UTS(Q) [daN/5 cm] | Glass strength [daN/5 cm] | L4 daN/5 cm | L15 daN/5 cm |
|---|---|---|---|---|---|---|
| 1 | 188 | not separable | 25.6/23.0 | 28.5 | 18.6 | 19.7 |
| 2 | 207 | not separable | 31.8/30.8 | 28.3 | 18.8 | 22.1 |
| 3 | 243 | not separable | 49.5/44.8 | 28.1 | 20.5 | 26.8 |

-continued

| Ex. | Weight per unit area [g/cm$^2$] | Delam. resistance [daN/5 cm] | UTS(L)/ UTS(Q) [daN/5 cm] | Glass strength [daN/5 cm] | L4 daN/5 cm | L15 daN/5 cm |
|---|---|---|---|---|---|---|
| 4 | 266 | not separable | 55.4/52.3 | 31.4 | 22.5 | 31.0 |
| 1* | 164 | 0.46 | 15.6/14.8 | 17.9 | 5.1 | 4.9 |
| 2* | 183 | 0.42 | 21.3/19.7 | 17.9 | 5.8 | 5.6 |
| 3* | 220 | 0.3 | 33.5/32.0 | 19.5 | 7.5 | 7.3 |
| 4* | 238 | 0.25 | 41.0/37.7 | 18.2 | 8.3 | 8.4 |

What is claimed is:

1. A process for producing a laminate comprising at least two layers, at least one layer comprising a nonwoven made from synthetic organic fibers and an outer layer comprising at least one layer of glass fibers, said process comprising:
   (a) applying a nonwoven made from synthetic organic fibers to a layer comprising glass fiber preconsolidated with a resin;
   (b) bonding the layers by needling in the direction of the layer comprising glass fibers such that some of the synthetic fibers penetrate the glass fiber layer and emerge from the outer surface of the glass fiber layer;
   (c) applying a resin binder solely to the side of the glass fiber layer away from the nonwoven synthetic fiber layer using a rotating roll whereby sufficient amounts of the resin binder penetrate into the glass fiber layer to secure the synthetic fibers within and on the surface of the glass fiber layer and wherein none of the binder resin enters the nonwoven synthetic fiber layer, which is free of said resin binder; and
   (d) drying the laminate.

2. The process as claimed in claim 1, wherein the glass fiber layer comprises a staple glass fiber nonwoven.

3. The process as claimed in claim 1, wherein the glass fiber layer comprises a glass fiber scrim.

4. The process as claimed in claim 1, wherein the glass fiber layer comprises a glass fiber woven.

5. The process as claimed in claim 1, wherein the binder in step (c) is an acrylate resin, a urea resin, or a melamine resin.

6. The process as claimed in claim 1, wherein the rotating roll applies the binder in an amount of 10-40 g/m$^2$ to the glass fiber layer.

7. The process as claimed in claim 1, wherein needling is carried out mechanically with a perforation density of from 15 to 50 perforations per cm$^2$.

8. The process as claimed in claim 1, wherein hydrodynamic needling is used.

9. The process as claimed in claim 8, wherein a water jet pressure in the range from 100 to 600 bar is used for needling.

10. The process as claimed in claim 1, wherein the synthetic organic nonwoven includes continuous polyester filaments.

11. The process as claimed in claim 2, wherein the staple glass fiber nonwoven has been preconsolidated with 5 to 45%, based on the weight of the glass fiber nonwoven, of a urea resin or melamine resin.

12. The process as claimed in claim 1, wherein the laminate includes at least one layer containing reinforcing threads.

13. The process of claim 1, wherein the dried laminate is further coated with at least one layer of a polymeric material to obtain a roofing or sealing sheet.

14. The process of claim 13, wherein the polymeric material comprises polyvinyl chloride.

15. The process of claim 1, wherein a bitumen layer is applied to the nonwoven synthetic organic fiber-side of the dried laminate to obtain a roofing or sealing sheet.

16. The process of claim 6, wherein the binder is applied in an amount of 10-25 g/m$^2$.

17. The process of claim 9, wherein the water jet pressure ranges from 100 to 400 bar.

* * * * *